US012604019B2

(12) United States Patent
Huang et al.

(10) Patent No.: US 12,604,019 B2
(45) Date of Patent: Apr. 14, 2026

(54) SYSTEM AND APPARATUS FOR VIDEO DISPLAY ON A PORTABLE DISPLAY DEVICE

(71) Applicant: The University of British Columbia, Vancouver (CA)

(72) Inventors: Xincheng Huang, Vancouver (CA); James Riddell, Kitchener (CA); Ailin Saggau-Lyons, Vancouver (CA); Bo Robert Xiao, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 18/905,049

(22) Filed: Oct. 2, 2024

(65) Prior Publication Data

US 2025/0126281 A1      Apr. 17, 2025

Related U.S. Application Data

(60) Provisional application No. 63/544,103, filed on Oct. 13, 2023.

(51) Int. Cl.
*H04N 19/42* (2014.01)
*H04N 19/124* (2014.01)
(Continued)

(52) U.S. Cl.
CPC ........... *H04N 19/42* (2014.11); *H04N 19/124* (2014.11); *H04N 19/167* (2014.11); *H04N 19/176* (2014.11); *H04N 19/463* (2014.11)

(58) Field of Classification Search
CPC .. H04N 19/597; H04N 19/176; H04N 21/816; H04N 19/167; H04N 19/70;
(Continued)

(56) References Cited

U.S. PATENT DOCUMENTS

2018/0373326 A1* 12/2018 Gatson ................... G01C 11/06

OTHER PUBLICATIONS

Alcabaza., et al., "Real-time Realistic Telepresence Using a 360° Camera and a Virtual Reality Box", I.J. Information Technology and Computer Science, 2019, vol. 3, pp. 46-52.
(Continued)

*Primary Examiner* — Farhan Mahmud
(74) *Attorney, Agent, or Firm* — Borden Ladner Gervais LLP; Geoffrey deKleine

(57) ABSTRACT

A method of a computing system of a communication network for providing video to a portable display device includes establishing a connection with a receiving system comprising the portable display device, obtaining compressed video data and decoding the compressed video data, receiving direction information from the receiving system, the direction information related to a direction of the portable display device, identifying a respective location of each macroblock of a plurality of macroblocks of the decoded video data, determining a respective distance between a location determined based on a field of view identified utilizing the direction information, and the respective location of each macroblock of the decoded video data, encoding the decoded video data utilizing a respective quantization parameter identified based on the respective distance determined for each macroblock to provide re-encoded video data, and sending the re-encoded video data to the receiving system for display on the portable display device.

20 Claims, 11 Drawing Sheets

(51) Int. Cl.
 *H04N 19/167*   (2014.01)
 *H04N 19/176*   (2014.01)
 *H04N 19/463*   (2014.01)
(58) Field of Classification Search
 CPC .. H04N 13/194; H04N 13/161; H04N 19/132;
     H04N 21/21805; H04L 65/70; G06F
       3/012; G06F 3/011; G06F 3/013
 See application file for complete search history.

(56)       References Cited

OTHER PUBLICATIONS

Feng., et al., "Viewport Prediction for Live 360-Degree Mobile Video Streaming Using User-Content Hybrid Motion Tracking", Proceedings of ACM Interactive Mobile Wearable Ubiquitous Technology, 2019, vol. 3(2), pp. 43:1-43:22.

Geiskler., et al., "A Real-time Foveated Multiresolution System for Low-bandwidth Video Communication", IS&T/SPIE Conference on Human Vision and Electronic Imaging III, Jan. 1998, vol. 3299, pp. 294-305.

Guenter., et al., "Foveated 3D Graphics", ACM Transactions on Graphics, 2012, vol. 31(6). pp. 164-2-164-10.

Gupta., et al., "Millimeter Wave meets Edge Computing for Mobile VR with High-Fidelity 8K Scalable 360 Video" 2019, pp. 1-6.

Hosseini., et al., "Adaptive 360 VR Video Streaming: Divide and Conquer!", IEEE International Symposium on Multimedia, 2016, pp. 107-110.

Hosseini., "View-Aware Tile-Based Adaptations in 360 Virtual Reality Video Streaming," IEEE Virtual Reality (VR), 2017, pp. 423 & 424.

Illahi., et al., "Cloud Gaming With Foveated Graphics", Manuscript submitted to ACM, 2018, pp. 1-23.

Kaplanyan., et al., "DeepFovea: Neural Reconstruction for Foveated Rendering and Video Compression using Learned Statistics of Natural Videos", ACM Transactions on Graphics, 2019, vol. 39(4), pp. 212:1-212:13.

Kim., et al., "360-Degree Video Offloading Using Millimeter-wave Communication for Cyberphysical System," Transactions on Emerging Telecommunications Technologies, 2019, vol. 30, pp. 1-15.

Kim., et al., "Eye Tracking-based 360 VR Foveated/tiled Video Rendering", 2018, 1 Page.

Kim., et al., "Foveated AR: Dynamically-Foveated Augmented Reality Display", ACM Transactions on Graphics, 2019, vol. 38(4), pp. 99:1-99:15.

Le., et al., "Computing Offloading Over mmWave for Mobile VR: Make 360 Video Streaming Alive", IEEE Access, 2018, vol. 6, pp. 66576-66589.

Le., et al., "Real-time 360-Degree Video Streaming over Millimeter Wave Communication", ICOIN, 2018, pp. 857-862.

Li., et al., "A Log-rectilinear Transformation for Foveated 360-Degree Video Streaming", IEEE Transactions on Visualization and Computer Graphics, May 2021, vol. 27(5), pp. 2638-2647.

Liu., et al., "360° Innovations for Panoramic Video Streaming", Proceedings of the 16th ACM Workshop on Hot Topics in Networks, 2017, pp. 50-56.

Liu., et al., "MEC-Assisted Panoramic VR Video Streaming Over Millimeter Wave Mobile Networks", IEEE Transactions on Multimedia, May 2019, vol. 21(5), pp. 1302-1303.

Meng., et al., "Kernel Foveated Rendering", Proceedings of the ACM on Computer Graphics and Interactive Technology, 2018, vol. 1(1), pp. 5:1-5:20.

Nasrabadi., et al., "Adaptive 360-Degree Video Streaming using Layered Video Coding", IEEE Virtual Reality, 2017, pp. 347 & 348.

Nguyen., et al., "An Evaluation of Tile Selection Methods for Viewport-Adaptive Streaming of 360-Degree Video", ACM Transactions on Multimedia Computing, Communications, and Applications, 2020, vol. 16(1), pp. 8:1-8:22.

Park., et al., "Navigation Graph for Tiled Media Streaming", Session 1D: Live Multimedia Applications & Streaming, 2019, pp. 447-455.

Piumsomboon., et al., "On the Shoulder of the Giant: A Multi-Scale Mixed Reality Collaboration with 360 Video Sharing and Tangible Interaction", Proceedings of the 2019 CHI Conference on Human Factors in Computing Systems, 2019, 18 Pages.

Qian., et al., "Flare: Practical Viewport-Adaptive 360-Degree Video Streaming for Mobile Devices", Proceedings of the 24th Annual International Conference on Mobile Computing and Networking, 2018, pp. 99-114.

Qian., et al., "Optimizing 360 Video Delivery Over Cellular Networks", Proceedings of the 5th Workshop on All ?ings Cellular: Operations, Applications and Challenges, 2016, pp. 1-6.

Ryoo., et al., "Design and Evaluation of a Foveated Video Streaming Service for Commodity Client Devices", Proceedings of the 7th International Conference on Multimedia Systems, 2016, 12 Pages.

Saraiji., et al., "Foveated Streaming: Optimizing Video Streaming for Telexistence Systems Using Eye-gaze Based Foveation", Study on Telexistence, 2017, 4 Pages.

Sun., et al., "Multi-path Multi-tier Degree Video Streaming in G Networks", Proceedings of the 9Th ACM Multimedia Systems Conference, 2018, pp. 162-173.

Turner., et al., "Phase-Aligned Foveated Rendering for Virtual Reality Headsets", IEEE Conference on Virtual Reality and 3D User Interfaces, 2018, pp. 711-712.

Wiedeman., et al., "Foveated Video Coding for Real-Time Streaming Applications," Twelfth International Conference on Quality of Multimedia Experience, 2020, 6 Pages.

Yen., et al., "Streaming 360° Videos to Head-Mounted Virtual Reality Using DASH over QUIC Transport Protocol", Proceedings of the 24th ACM Workshop on Packet Video, 2019, pp. 7-12.

* cited by examiner

100

200

SYSTEM AND APPARATUS FOR VIDEO DISPLAY ON A PORTABLE DISPLAY DEVICE

CROSS-REFERENCE TO RELATED APPLICATION

The present application claims the benefit of and priority to U.S. Provisional Patent Application No. 63/544,103, filed Oct. 13, 2023, the entire content of which is incorporated herein by reference.

FIELD OF TECHNOLOGY

The present disclosure relates to a method and apparatus for remote video display utilizing a portable display device.

BACKGROUND

High-field-of-view images and videos, such as images or video having about 180° to about 360°, facilitate exploration of a virtual or physical scene with omni-directional freedom. As such, these images and videos are natural applications for augmented reality (AR), virtual reality (VR), and other portable display devices such as smartphones (mobile AR). Streaming on-demand videos, such as pre-recorded video content, to such portable display devices, enables rich multimedia applications for e.g. gaming and immersive entertainment. Use of a wireless network for such display devices enables live and portable applications. Alternatively, the ability to stream live video anytime and anywhere may bring about more immediate telepresence experiences, for example, enabling efficient collaboration and education over long distances.

Videos that extend across a large field of view, such as about 180° to about 360° videos, require a much higher resolution than regular videos to achieve a satisfactory perceived visual quality, particularly for viewing on portable devices such as head-mounted displays. This higher resolution poses a challenge in video processing and network bandwidth. Tile-based viewport adaptation and foveated rendering have been utilized to save network bandwidth. While tile-based viewport adaptation prioritizes streaming video tiles within a user's field of view (FOV), foveated rendering streams high-resolution video in the focal area while heavily compressing the remaining pixels. However, both methods result in delayed video tile delivery and video artifacts caused by latency.

Improvements in providing video for display on a portable display device are desirable.

SUMMARY

According to an aspect of an embodiment, a method of a computing system of a communication network for providing video to a portable display device is provided. The method includes establishing a connection with a receiving system comprising the portable display device, obtaining compressed video data and decoding the compressed video data to provide decoded video data, receiving direction information from the receiving system, the direction information related to a direction of the portable display device, identifying a respective location of each macroblock of a plurality of macroblocks of the decoded video data, determining a respective distance between a location determined based on a field of view identified utilizing the direction information, and the respective location of each macroblock of the decoded video data, encoding the decoded video data utilizing a respective quantization parameter identified based on the respective distance determined for each macroblock to provide re-encoded video data, and sending the re-encoded video data to the receiving system for display on the portable display device.

According to another aspect of an embodiment, there is provided a method for an edge computing system of a wireless communication network for providing video to a portable display device. The method includes establishing a connection with a receiving system comprising the portable display device, obtaining video data for providing to the receiving system, receiving direction information from the receiving system, the direction information related to a direction of the portable display device, identifying a respective location of each macroblock of a plurality of macroblocks of the decoded video data, determining a respective distance between a field of view location identified utilizing the direction information, and the respective location of each macroblock of the decoded video data, encoding the decoded video data utilizing a respective quantization parameter identified based on the respective distance determined for each macroblock to provide encoded video data, and sending the encoded video data to the receiving system for display on the portable display device.

According to another aspect of an embodiment, a computing system of a communication network is provided. The computing system includes at least one processor, and at least one memory storing instructions thereon for execution by the at least one processor to cause the apparatus to perform the method.

BRIEF DESCRIPTION OF THE DRAWINGS

Embodiments of the present disclosure will now be described, by way of example only, with reference to the attached Figures, in which.

DETAILED DESCRIPTION

Figure 1:
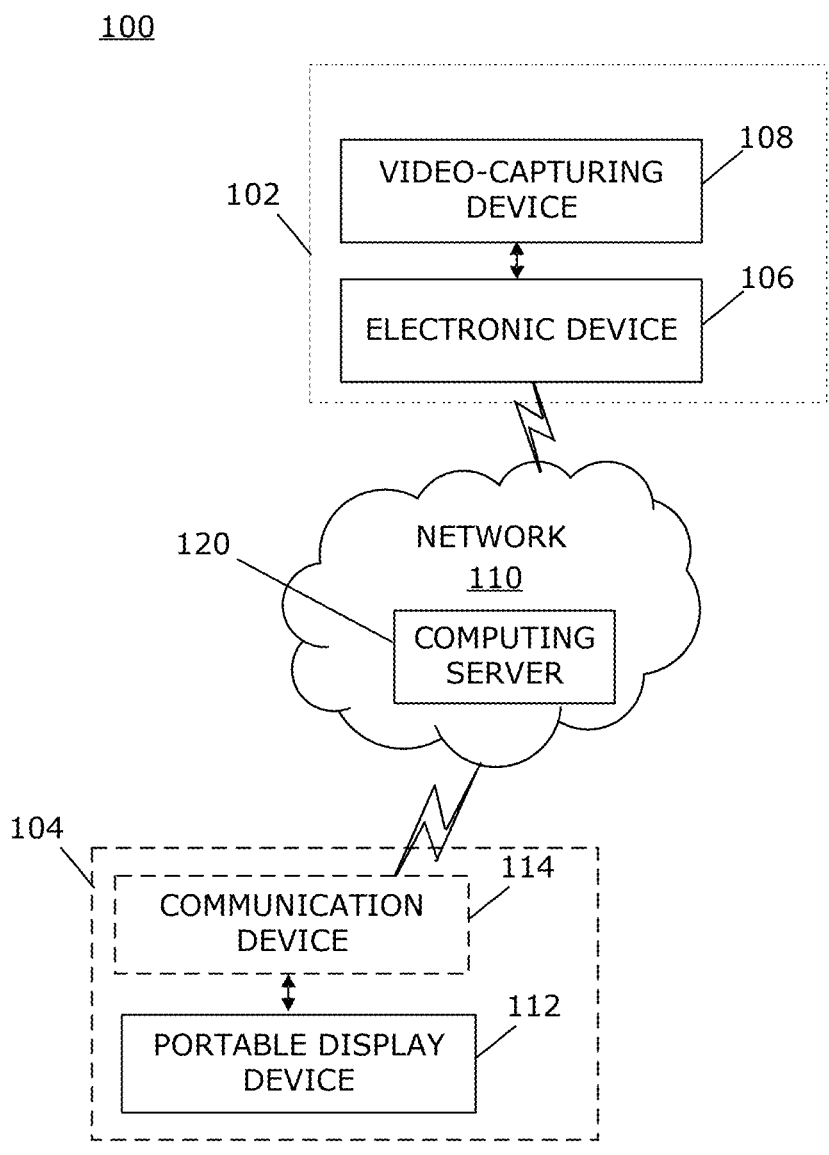
FIG. 1 is a block diagram of an apparatus including a sending system and a receiving system including a portable display device for displaying video display in accordance with an embodiment.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The following describes a method of a computing system of a communication network for providing video to a portable display device. The method includes establishing a connection with a receiving system comprising the portable display device, obtaining compressed video data and decoding the compressed video data to provide decoded video data. The method also includes receiving direction information from the receiving system, the direction information related to a direction of the portable display device, identifying a respective location of each macroblock of a plurality of macroblocks of the decoded video data, determining a respective distance between a location determined based on a field of view identified utilizing the direction information, and the respective location of each macroblock of the decoded video data, encoding the decoded video data utilizing a respective quantization parameter identified based on the respective distance determined for each macroblock to provide re-encoded video data, and sending the re-encoded video data to the receiving system for display on the portable display device.

A simplified block diagram of an apparatus 100 for providing video to a portable display device 112 is shown in FIG. 1. The apparatus 100 in this example includes sending system 102 and a receiving system 104.

The sending system 102 is connected to the receiving system 104 by a communication network 110, such as a $5^{th}$ generation mobile network (5G network) or an internet service provider (ISP) network. The network 110 includes a computing server 120 that is utilized for video processing and carrying out the method as described herein. The computing server may be an edge computing system in the example of the 5G network, or may be an internet server caching proxy in the example of the ISP network. The sending system and receiving systems may be connected to the network by a variety of communication technologies, including cellular telecommunications (e.g. 3G, 4G, 5G), Ethernet, coax, Wi-Fi, Bluetooth®, optical, or a combination of communications.

The sending system includes an electronic device 106, which may be any suitable electronic device, including, for example, a personal computing device, a mobile computing device, a smart phone or any other suitable electronic device.

A video capturing device 108 is connected to the electronic device 106, by wired or wireless connection. The video capturing device 108 is utilized for capturing video or images that are sent to the receiving system 104 via the electronic device 106 connected to the communication network 110. The video capturing device 108 may be any suitable camera or cameras that capture the images or video utilized for image or video display on a portable display device 112.

The receiving system 104 includes the portable display device 112 that is utilized to display images or video based on images or video sent from the sending system 102. The portable display device 112 may be any suitable portable display device such as a smartphone, a tablet computer, an immersive display, or any other suitable portable display device 112.

The portable display device may be a communication device operable to connect to the communication network 110, or the receiving system 104 may include a communication device 114 as illustrated in FIG. 1.

The communication device 114 may be, for example a smartphone, notebook computer, tablet computer, mobile internet device, and so forth. The communication device 114 may be connected to a modem or may directly connect to the network 110 for transmitting and receiving data, including image or video data to and from the portable display device 112, via the communication device 114.

The computing server 120 is operable to receive information from the portable display device 112, including information relating to a direction of the portable display device 112. Based on the information received from the portable display device 112, the computing server 120 is operable to receive video from the sending system 102, and to encode a foveated video stream for sending to the receiving system 104. Based on updates or changes in the portable display device direction, the server 120 is operable to re-encode a video stream with foveated compression that is sent to the receiving system 104 for displaying video on the portable display device 112.

Figure 2:
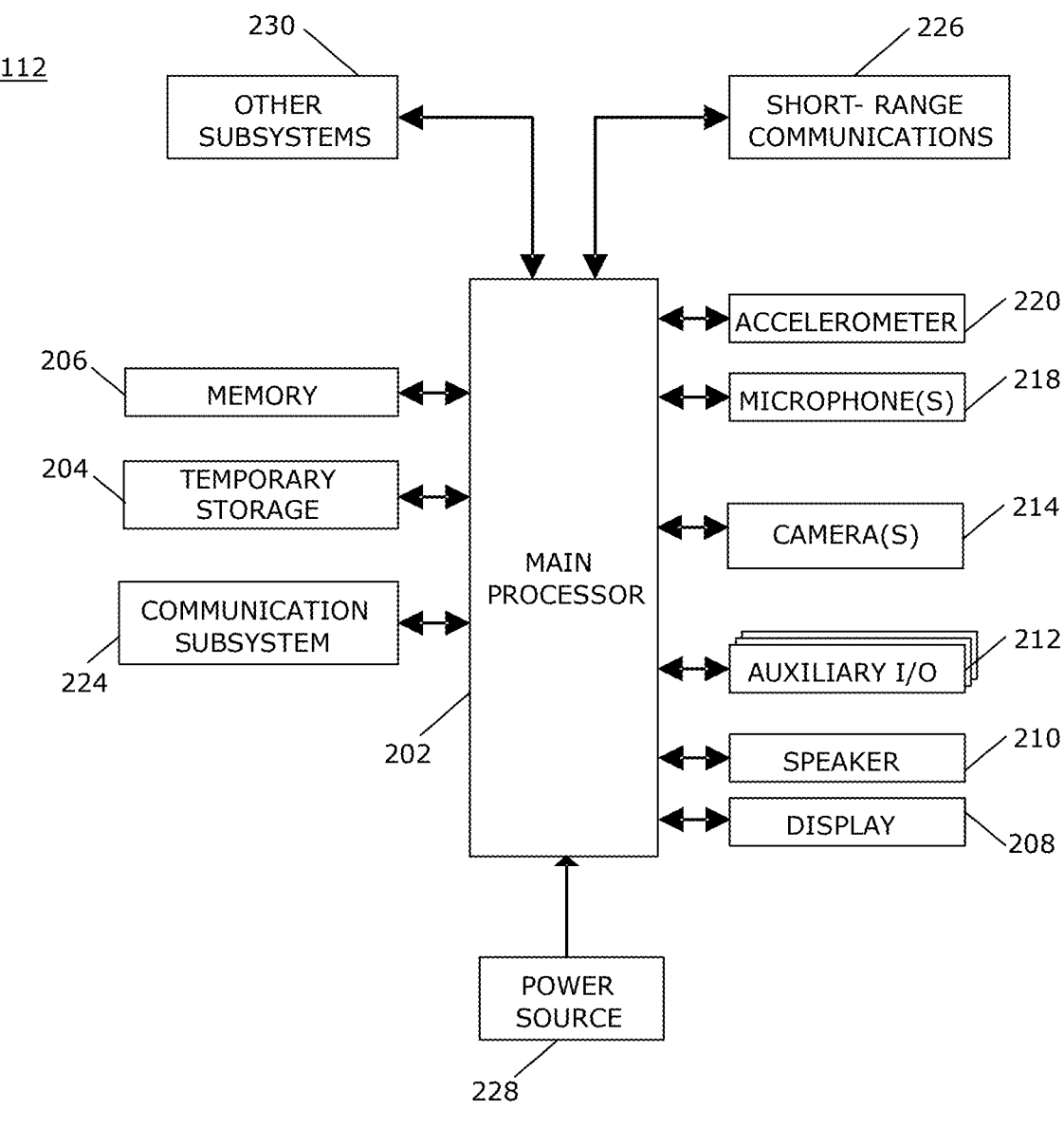
FIG. 2 is a block diagram illustrating a portable display device of the receiving system of FIG. 1, in accordance with an aspect of an embodiment.

A simplified block diagram of an example of a portable display device 112 is shown in FIG. 2. As indicated above, the portable display device 112 may be any suitable wired or wireless portable display device such as a smartphone, a tablet computer, an immersive display, or any other suitable portable display device 112.

The portable display device 112 includes multiple components, such as a main processor 202 that controls the overall operation of the portable display device 112.

The main processor 202 interacts with other components of the portable display device 112, such as, for example, a temporary storage device 204, a memory 206, a display device 208 which may include one or more displays, a speaker 210, an auxiliary input/output (I/O) subsystem 212, one or more cameras 214, one or more microphones 218, an accelerometer 220, a communication subsystem 224, short-range communications 226, a power source 228, and, optionally, other subsystems 230.

The temporary storage device 204 may be, for example, Random Access Memory (RAM) that stores data that is processed by the main processor 202. The memory 206, such as flash memory, is utilized for persistent storage.

The portable display device 112 provides images or video output on the display 208 device, which includes an interface, a controller and at least one display to display images. The images displayed may be a respective image in front of each one of the user's eyes, such as may be utilized in an immersive display, or may be a single image such as may be displayed on a tablet computer or a smartphone. In addition to the display device 208, output may be provided via the speaker or speakers 210 or other audio output such as headphones or earphones. The auxiliary input/output (I/O) subsystem 212 includes an interface through which, for example, a USB controller or other peripheral device may be connected.

Input to the portable display device 112 may be provided via one or more cameras 214 mounted in or on the body of the portable display device 112. The cameras may include front facing and rear facing cameras. In the example of the immersive display, the cameras may include external cameras and internal cameras. Optionally, the cameras may be utilized to obtain images extending around the portable display device 112. The cameras 214 may also include cameras to obtain images in an upward direction from the user, and in a downward direction from the user. Thus, cameras 214 may be utilized to provide images of the user's environment or surroundings.

The terms upward and downward are utilized herein to generally describe direction of view of the cameras 214 relative to the user when the user is in an upright position, and such terms are not otherwise limiting.

The one or more microphones, referred to herein as the microphone 218, may also be mounted in the body of the portable display device 112 to provide input by converting audible information to electrical signals, which may be processed by the main processor 202 and may be transmitted to another electronic device to which the portable display device 112 is coupled.

The portable display device 112 also includes an accelerometer 220, or a gyroscope or both, coupled to the main processor 202 to detect acceleration, which is utilized by the main processor 202 to detect changes in direction of the portable display device 112. Thus, changes in direction of the portable display device 112 are detected based on movement of the portable display device 112. The main processor 202 is therefore operable to track movement of the portable display device 112 and to provide direction information to the network based on changes in direction. Directional information may also be obtained by processing imagery from the cameras 214, for example, by sensing the relative motion of the imagery via optical flow, simultaneous localization and mapping (SLAM), or other image processing approaches. The device's direction may be determined based on the accelerometer data, gyroscope data, camera motion, or any combination of these inputs.

The one or more speakers 210 or other sound generators, referred to herein as the speaker or speakers 210, may also be mounted in the body of the portable display device 112 to provide sound.

The communication subsystem 224 receives signals from another electronic device, such as the communication device 114 shown in FIG. 1, and sends signals to the other electronic device to which the portable display device 112 is coupled. Thus, for example, signals from the accelerometer 220 are utilized to determine a change in direction of the portable display device 112 by the main processor 202. Direction information, indicating a change in direction of the portable display device 112 may be sent, via the communication subsystem 224, to the communication device 114, to be provided to the computing server 120 on the network 110.

The signals from the microphone 218 or signals from the cameras 214 may also be sent via the communication subsystem 224. The communication subsystem 224 is also responsible for receiving signals from the other electronic device for processing by the main processor 202 to cause images, which may include video, to be displayed on the display 208 and for audio to be output through the speaker 210.

The portable display device 112 optionally includes short-range communications 226 to perform various communication functions. For example, the portable display device 112 may include Bluetooth, Bluetooth Low Energy (BLE) or infrared (IR) communications capability, for example, for communicating with a peripheral device or accessory.

The power source 228 may be one or more rechargeable batteries or a port to an external power supply to power the portable display device 112.

The systems and subsystems that interact with the main processor 202 and are described herein are provided as examples only. Other subsystems 230 may also interact with the main processor 202.

Figure 3:
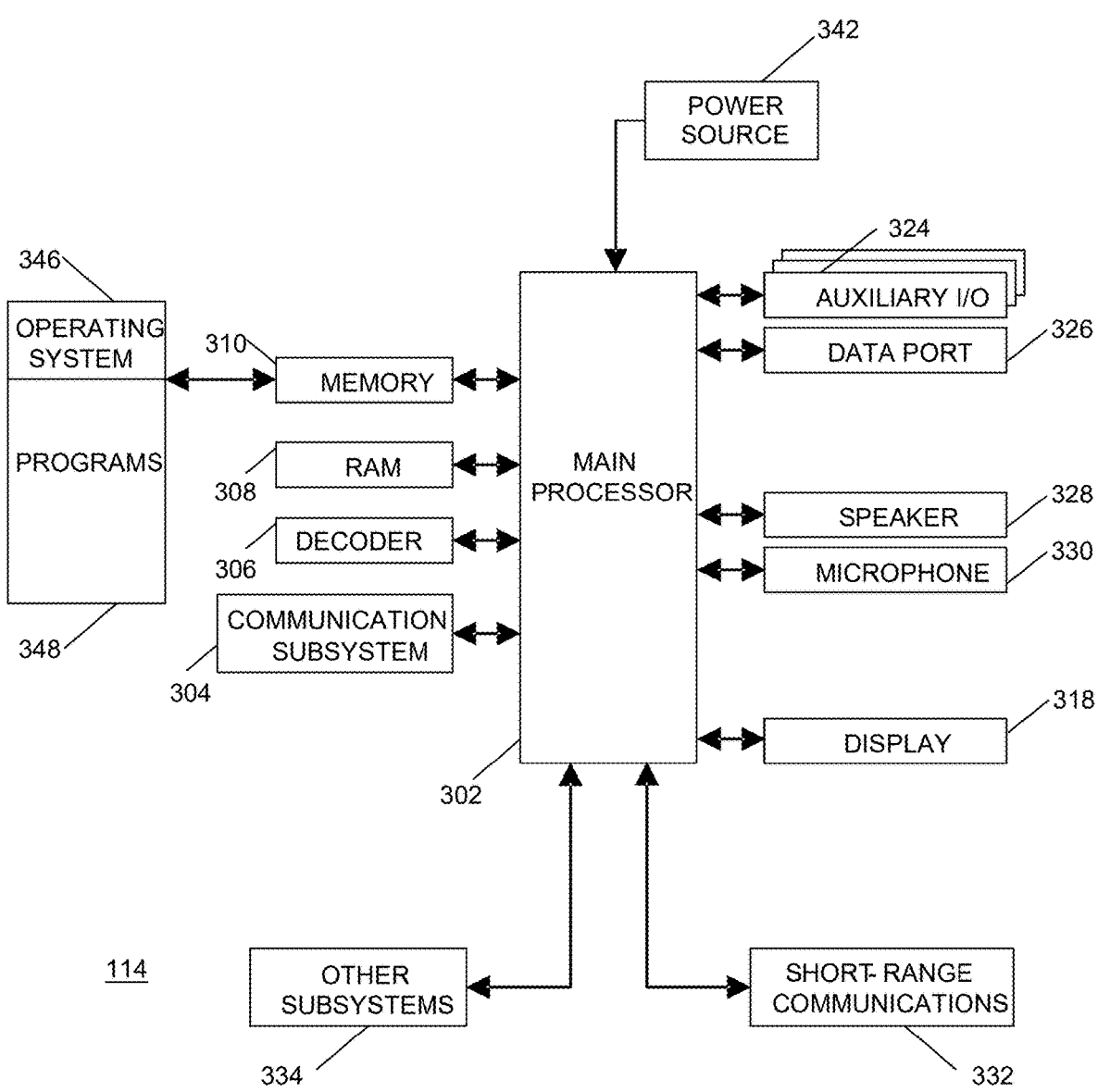
FIG. 3 is a block diagram of a communication device of the receiving system of FIG. 1, in accordance with an aspect of an embodiment.

A block diagram of one example of the communication device 114 is shown in FIG. 3. As indicated above, the communication device 114 may be, for example, a smartphone, notebook computer, tablet computer, mobile internet device, a desktop computer and so forth.

The communication device 114 includes multiple components, such as a processor 302 that controls the overall operation of the communication device 114. Communication functions, including data communications, are performed through a communication subsystem 304. Data received by the communication device 114 is decompressed and decrypted by a decoder 306. The communication subsystem 304 receives messages from and sends messages to the network 110. A power source 342, such as an external power supply, powers the communication device 114.

The processor 302 interacts with other components, such as a Random Access Memory (RAM) 308, memory 310, a display 318, an auxiliary input/output (I/O) subsystem 324, a data port 326, a speaker 328, a microphone 330, short-range communications 332 and other device subsystems 334.

The communication device 114 includes an operating system 346 and software programs, applications, or components 348 that are executed by the processor 302 and are typically stored in a persistent, updatable store such as the memory 310. Additional applications or programs may be loaded onto the communication device 114 through the network 110, the auxiliary I/O subsystem 324, the data port 326, the short-range communications subsystem 332, or any other suitable subsystem 334.

A received signal is processed by the communication subsystem 304 and input to the processor 302. The processor 302 processes the received signal for output to the display 318 and/or to the auxiliary I/O subsystem 324. Data may be transmitted over the network 110.

The communication device 114 is in communication with the portable display device 112 via wired or wireless connection such as short-range communications, through the short-range communications subsystem 332, such as Bluetooth™ or WiFi, or any other suitable communication connection.

Figure 4:
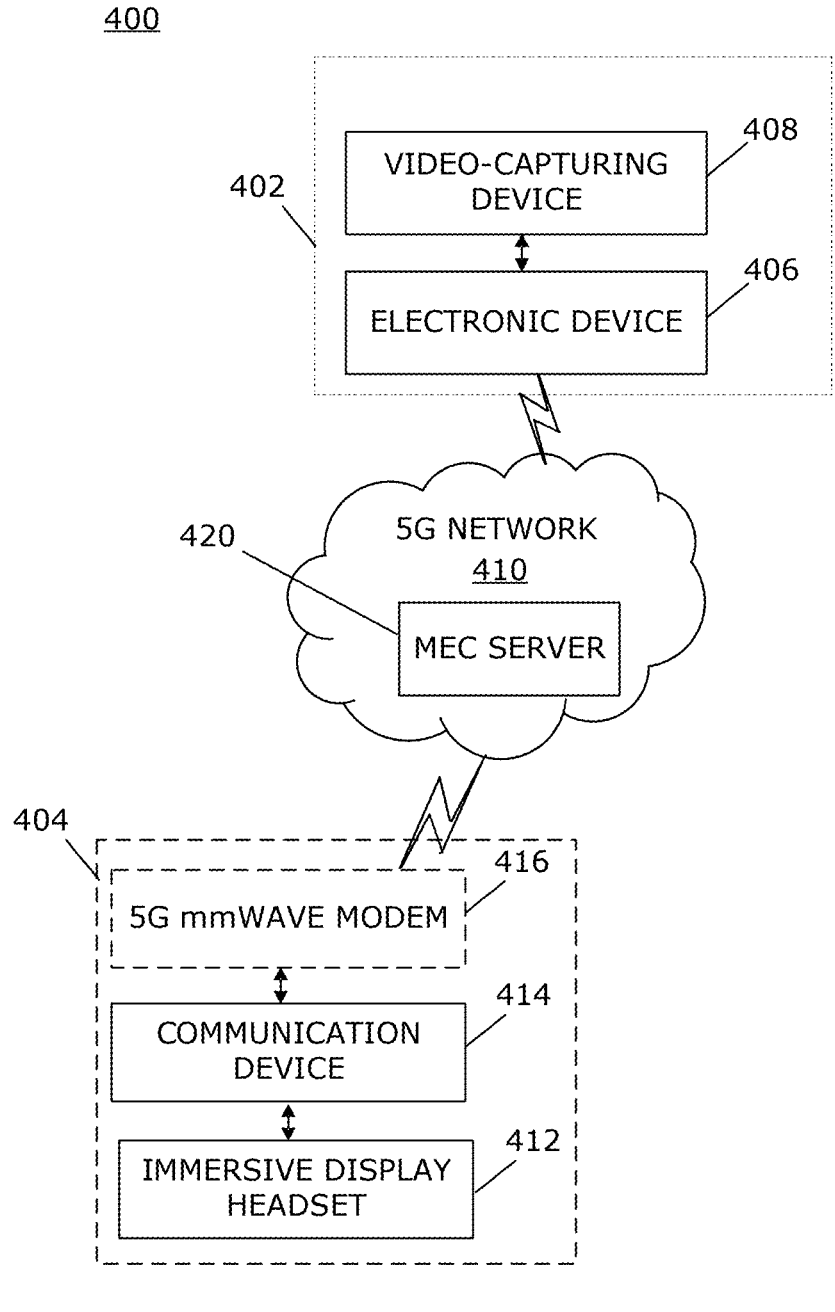
FIG. 4 is a block diagram of an apparatus including a sending system and a receiving system in accordance with a particular example of an embodiment.

FIG. 4 shows a simplified block diagram of a particular example of an apparatus 400 for providing video to a portable display device. In this example, the portable display device is an immersive display headset 412 and the communication network comprises a 5G network. The apparatus 400 includes the sending system 402 and the receiving system 404.

Figure 5:
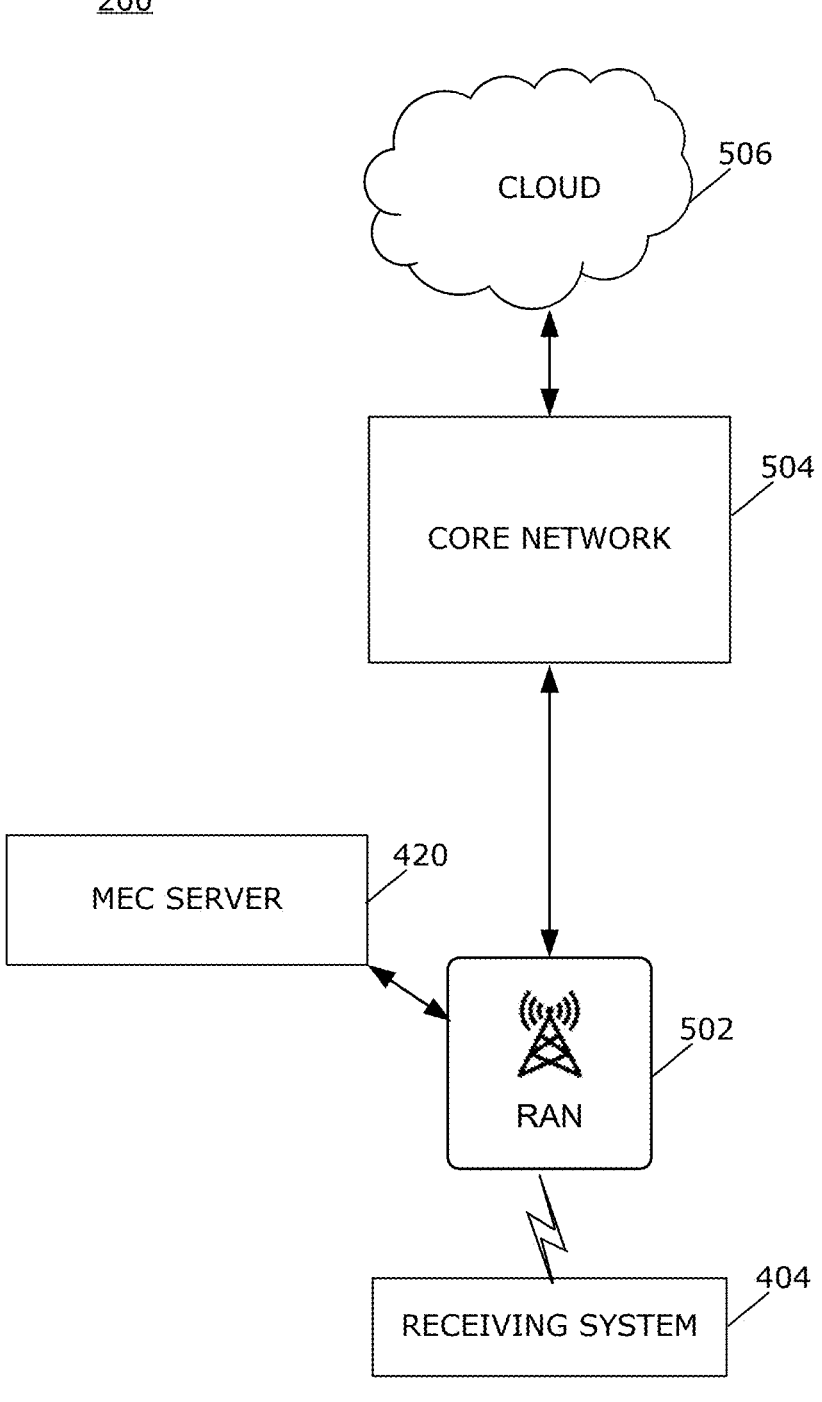
FIG. 5 is a block diagram showing a communication network in communication with the receiving system in accordance with an example of an embodiment.

In the present example, the sending system 402 is connected to the receiving system 404 by the 5G network 410, which includes a multi-access edge computing server (MEC) 420 that is utilized for video processing and for carrying out the method of FIG. 5. Other communications, in addition to the 5G network 410, may also be utilized.

The sending system includes the electronic device 406, which may be any suitable electronic device for connecting to and providing communications to and from the 5G network, by wired or wireless connection. The video capturing device 408 is utilized for capturing video or images that are sent to the receiving system 404 via the electronic device 406 connected to the 5G network 410. The video capturing device 408 in this example is a camera or cameras that capture the images or video that are utilized for image or video display on a virtual reality headset. In one example, the video capturing device 408 is an Insta360 Evo 360° camera, available from Insta360. Other cameras available from Insta360 as well as cameras available from, for example, Ricoh, GoPro, or ZTIANFOTO may also be utilized for capturing high-field-of-view video.

The receiving system 404 includes the portable display device, which in this example is the immersive display headset 412 that is utilized to display images or video based on images or video sent from the sending system 402. The immersive display headset 412 may be any suitable headset such as a Meta Quest 2 VR headset available from Meta™. Other Meta VR headsets may also be successfully implemented, as well as headsets from other manufacturers, such as an Apple Vision Pro headset, available from Apple™, a Sony Playstation VR2 headset, available from Sony™, an HTC Vive Pro 2 headset, available from HTC™, and others. The portable display device may also be an augmented reality head-mounted device such as the Microsoft Hololens, xReal Air, Meta Orion, etc.; or it may be a portable device such as an ordinary smartphone or tablet computer.

The receiving system 404 in this example also includes a communication device 414, such as a smartphone, notebook computer, tablet computer, mobile internet device, and so forth. The communication device 414 is connected to a 5G mmWave modem 416. The 5G mmWave modem 416 is utilized to connect the communication device 414 to the 5G network 410 for transmitting and receiving data, including image or video data to and from the immersive display headset 412, via the communication device 414. The 5G mmWave modem 416 is utilized to provide relatively high data transmission speed and relatively low network latency compared to, for example, 5G utilizing sub-6 GHz frequencies. Other communication protocols, such as WiFi, 4G, 6G, Ethernet, may be utilized to connect the communication device 414 to the communications network. The receiving system 404 may be integrated with the communication device 414, or connected to the communication device by wired or wireless means.

The MEC server 420 is operable to receive information from the immersive display headset 412 via the communication device 414 and the 5G mmWAVE modem 416, including information relating to direction of the immersive display headset 412, which is indicative of the direction of the head or head movement when the immersive display headset 412 is worn by the user. Based on the information received from the immersive display headset 412, the MEC server 420 is operable to receive video from the sending system 402, and to encode a foveated video stream for sending to the receiving system 404. Based on updates or changes in head position or direction, as determined by changes in the direction of the immersive display headset 412, the MEC server 420 is operable to re-encode a video stream with foveated compression that is sent to the receiving system 404 for displaying video on the immersive display headset 412.

A block diagram illustrating a communication network, which in this example is a 5G network, in communication with the receiving system 404 is shown in FIG. 5. The communication network includes the MEC server 420, or multi-access edge computing server that provides services and computational capabilities at the network's edge, i.e., closer to the receiving system 404 or other user equipment.

The radio access network (RAN) node 502, such as a gNodeB provides access to the core network 504 via a network function, which is connected to the cloud 504 for cloud-based storage and computation. The radio access network (RAN) node 502 is configured to connect to the receiving system 404 utilizing mm-wave signals, i.e., between 24 GHz and 300 GHz in the radio frequency spectrum to provide low-latency data transmission. The MEC server 420 is connected to and located near or even at the RAN node 502 to provide the computational resources near the RAN node 502, rather than in the cloud 506.

The 5G mmWave modem 416, as shown in FIG. 4, is utilized for millimeter wave (mmWave) data communication between the communication device 414 and the RAN node 502.

Figure 6:
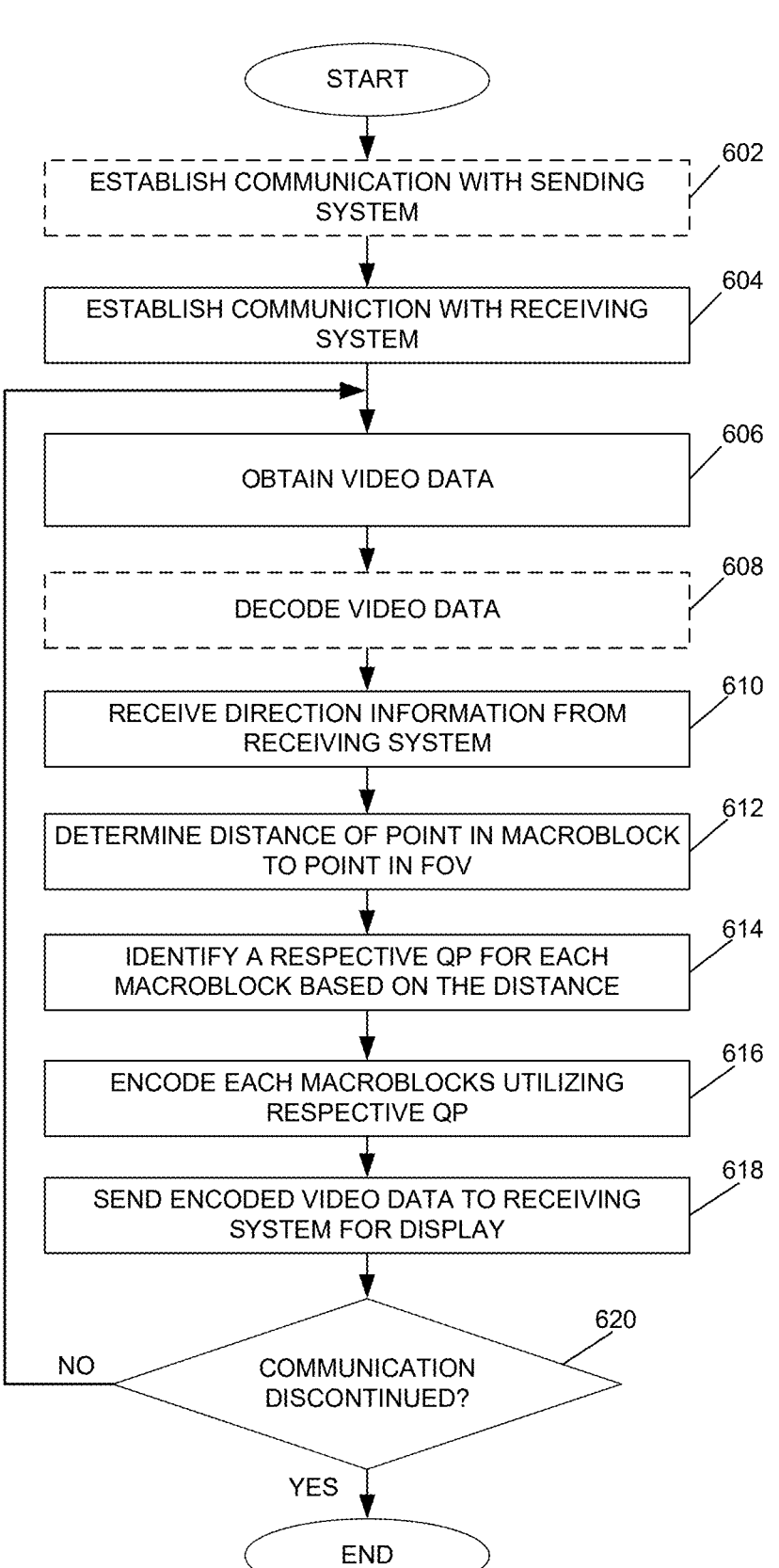
FIG. 6 is a flowchart illustrating a method of a computing system of a communication network for providing video to a portable display device in accordance with an aspect of an embodiment.

A flowchart illustrating a method of a computing system of a communication network for providing video to a portable display device in accordance with an aspect of an embodiment is shown in FIG. 6. The method may be carried out by software executed, for example, at the computing server 120 as illustrated in FIG. 1, such as the MEC server described in relation to the example shown in FIG. 4. Coding of software for carrying out such a method is within the scope of a person of ordinary skill in the art given the present description. The method may contain additional or fewer processes than shown or described, and may be performed in a different order. Computer-readable code executable by at least one processor to perform the method may be stored in a computer-readable medium, such as a non-transitory computer-readable medium.

Optionally, a communication connection may be established with the sending system 102 at 602 for receiving video captured utilizing the video-capturing device 108 and compressed and sent to the computing server 120 of the network 110 via the electronic device 106. The communication connection is established, for example, in the case of receipt of live video or video from a third party. Alternatively, the video may be retrieved from another server or from a storage device stored on the network 110 or available via the network 110.

A communication connection is established with the receiving system at 604 including a pipeline for focally encoded video stream utilizing direction data from the portable display device 112.

The video data is obtained at the computing server 120 at 606. Thus, the computing server 120 obtains the compressed video data from the sending system 102. As referred to above, in alternative embodiments, the computing server 120 obtains the video, for example, from another server or from a storage device stored on the network 110 or available via the network 110. In the embodiments in which the received video data is encoded, the video data is decoded at 608 to provide decoded video data.

The video data may be recorded using a specific projection format in order to encode a large field of view in a two-dimensional digital image form. The projection format may be, for example, fisheye projection, equirectangular projection, equiangular projection, cube maps, etc. The video data may additionally be distorted due to specific characteristics of the lens used to capture the video.

Relevant projection format parameters, such as the field-of-view, focal center, projection matrix, etc., along with relevant distortion parameters, such as cylindrical, spherical, fisheye and chromatic distortion parameters will be made available to the computing server and receiving device, to enable the receiver to render the video without significant distortion. The parameters may be included with the encoded video data as embedded metadata, prearranged between sender, receiver and computing server, or carried in a separate communication message.

The receiver uses the projection format and distortion parameters to render an appropriate portion of the received video based on its direction and the display's field-of-view. In an example, a pixel in video data may correspond with a direction of the camera that captured the video. The receiver may then utilize the projection and distortion parameters to determine the directions for pixels, and display those pixels that fall within the field-of-view at an appropriate position in the display.

Direction information is received from the receiving system 104 at 610. The direction information received is related to a direction of the portable display device 112. An initial direction may be a default direction and direction information thereafter based on changes in direction as detected at the portable display device 112. Thus, an inertial measurement unit, such as the accelerometer 320, or a gyroscope, or measurements from the camera, may be utilized to detect changes in direction of the portable display device 112. The direction identifies a view direction in three-dimensional space, for example, to a location of a center of a field of view of the portable display device 112. Thus, the direction information identifies the direction of the portable display device 112 in three-dimensional space and is correlated to a view direction in the video data. Optionally, field of view information may be included such that the field of view is dependent on factors such as distance of a viewer from the portable display device 112 or the characteristics of the display itself, such as the display size, lens configuration and viewing angle.

For each macroblock of the video data, the projection and distortion parameters are used to determine the location corresponding to the macroblock, if present. The location may be, for example, the camera direction to the center of the macroblock, expressed as a spherical angle. A distance from a point in the field of view to the location of the macroblock is determined at 612. The distance is determined by identifying the angle between the view direction and the spherical angle to the macroblock. Thus, each distance may be a spherical angle.

Based on the respective distance determined for each macroblock at 612, a respective quantization parameter (QP) is determined at 614. The QP may be determined utilizing thresholds, for example, utilizing a first quantization parameter for macroblocks that are within a threshold distance of a center of the field of view and a second quantization parameter for macroblocks outside the threshold distance of the center of the field of view. Other thresholds and other quantization parameters may also be utilized. In another example, a first quantization parameter may be utilized for all macroblocks within the field of view and a different quantization parameter may be utilized for macroblocks that are not within the field of view. Rather than utilizing a threshold-based determination, the quantization parameter utilized may be correlated with the distance, for example, by computing the quantization parameter using a mathematical function of the distance.

The video data is encoded at 616 by encoding each of the macroblocks utilizing the respective quantization parameter determined at 614. In an example implementation, an increased quantization parameter results in a decrease in the amount of data used to convey the macroblock, and may also result in a decrease in the fidelity of the corresponding video data after decoding. The encoded video data is sent to the receiving system 104 for display at 618.

The process continues, for example, at 606 until the video transmission is discontinued as determined at 620. The process may be discontinued in any suitable manner and for any suitable reason. For example, the process may be discontinued in response to a lost connection, an end of the video for display, or any other suitable reason.

Figure 7:
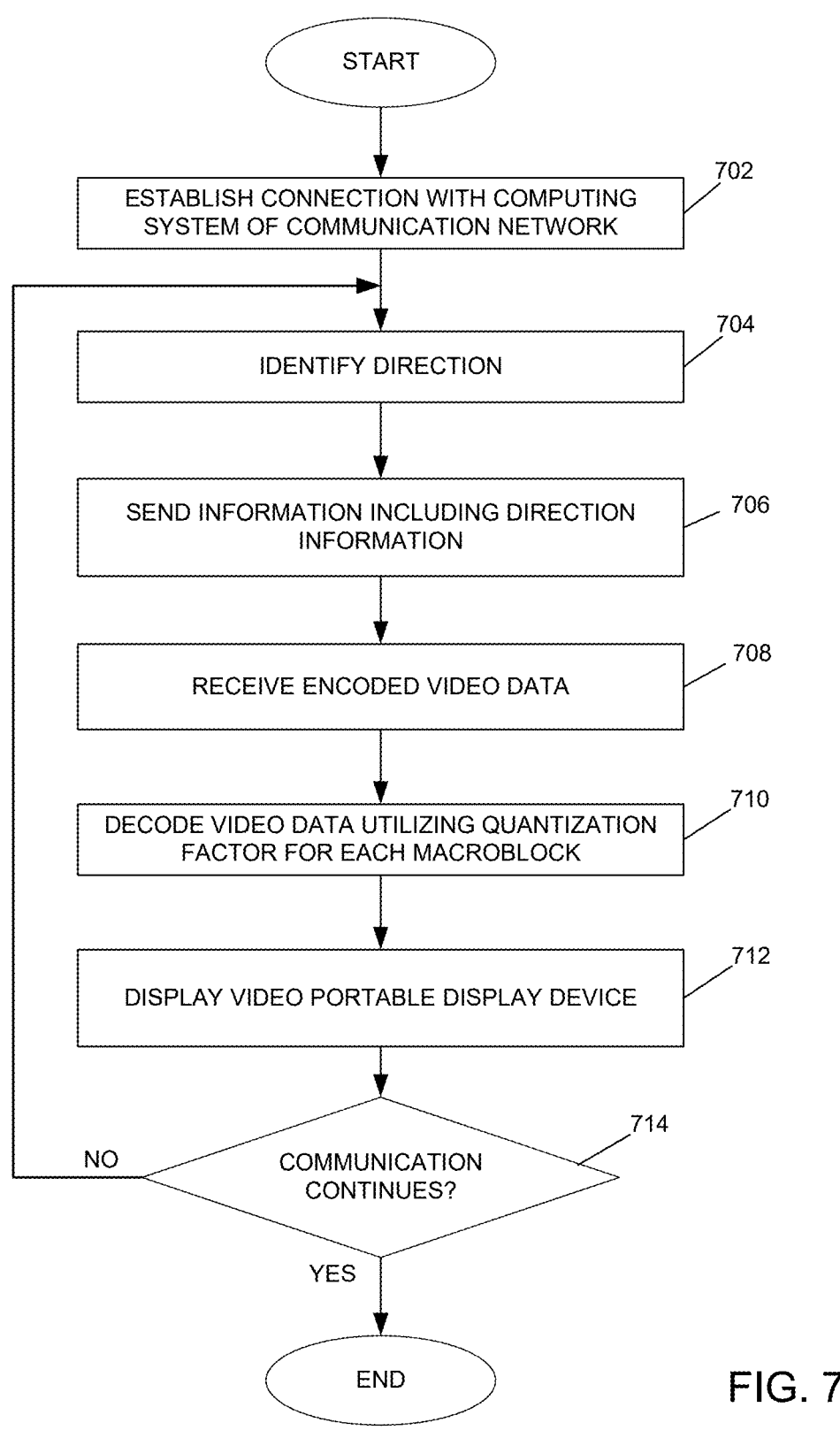
FIG. 7 is a flowchart illustrating a method of a portable display device in accordance with an aspect of an embodiment.

Referring now to FIG. 7, a flowchart illustrating a method of a receiving system is shown. The method may be carried out by software executed, for example, at the receiving system 104 as illustrated in FIG. 1, for example, at the communication device 114 and the portable display device 112. Coding of software for carrying out such a method is within the scope of a person of ordinary skill in the art given the present description. The method may contain additional or fewer processes than shown or described, and may be performed in a different order. Computer-readable code executable by at least one processor to perform the method may be stored in a computer-readable medium, such as a non-transitory computer-readable medium.

A communication connection is established with the computing server 120 of the communication network at 702. The communication connection includes a pipeline for a focally encoded video stream utilizing direction data from the portable display device 112.

Direction information related to a direction of the portable display device 112 is determined at 704. An initial direction may be a default direction and direction information thereafter based on changes in direction as detected at the portable display device 112. Thus, an inertial measurement unit such as the accelerometer 220, or a gyroscope, or motion information derived from the camera device, may be utilized to detect changes in direction of the portable display device 112. Direction information including changes in direction are sent to the computing server 120 at 706.

The direction information identifies a view direction in three-dimensional space, for example, to a location of a center of a field of view of the portable display device 112. Thus, the direction information identifies the direction of the portable display device 112 in three-dimensional space. Optionally, additional information may be included along with direction information. For example, for a portable display device 112 for which the distance to the viewer or user is not fixed, a distance of the viewer from the portable display device 112 may be determined, for example, utilizing the cameras 214, and distance information or information relating to the field of view as determined based on the distance, may be sent to the computing server 120.

Encoded video data is received at 708 and the video data is decoded at 710 by decoding each of the macroblocks of video data utilizing respective quantization parameters identified in the encoded video data, for example, included in received metadata.

The decoded video data is utilized to display video on the portable display device at 712.

The process continues, for example, at 704 until the video transmission is discontinued as determined at 714. The process may be discontinued in any suitable manner and for any suitable reason. For example, the process may be discontinued in response to a lost connection, an end of the video for display, or any other suitable reason.

Streaming video such as full 360° video, provides the feeling of immersion and presence for the user of a portable display device. The user, however, is only capable of perceiving a small window of this video due to the limited field-of-view of human vision and the portable display device. Transmitting only video that is visible to the user is favorable for reducing bandwidth.

Thus, the video is greater than the field of view at the receiving system. For example, the video may be 360° video. The portable display device of the receiving system, however, has a more limited field of view, such as, for example, about a 90° field of view. The method and system of the present disclosure facilitate foveated compression based on direction of the portable display device with little or unnoticeable latency and high visual quality, i.e., little or no discernible artifacts.

High latency between the measurement of the head direction and the transmission of the corresponding video, results in the user seeing partial frames that do not cover the entire field of view as they rotate their head. In high-latency scenarios, a system may transmit more video data to avoid partial frames, at the cost of increased bandwidth usage.

The present method provides video transmission with relatively low latency, high video quality, and low bandwidth usage, that is less susceptible to video artifacts at the periphery of the field of view.

EXAMPLES

The following examples are submitted to further illustrate embodiments of the present invention. These examples are intended to be illustrative only and are not intended to limit the scope of the present invention.

Figure 8:
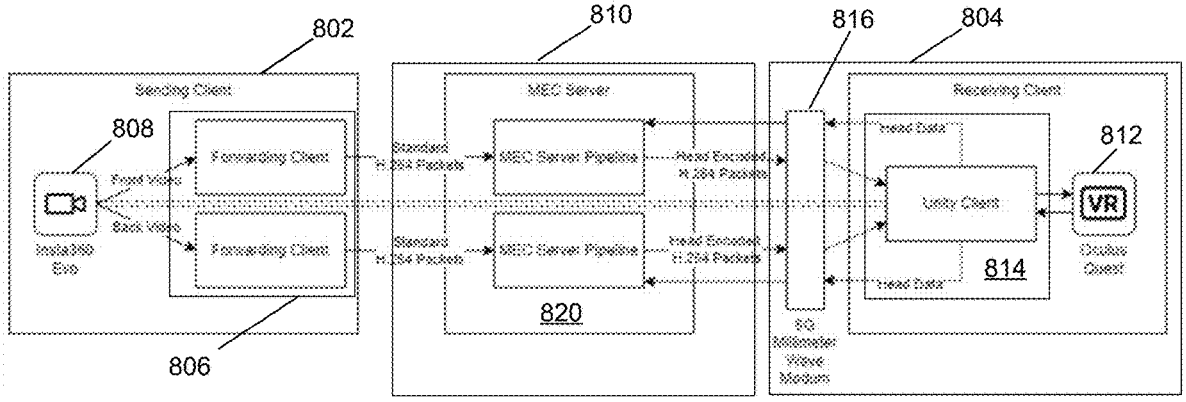
FIG. 8 is a functional block diagram illustrating the overall system for providing video to an immersive display in accordance with an example of an embodiment.

The apparatus, as illustrated in FIG. 4 was implemented, providing 360° video for virtual reality telepresence. A functional block diagram illustrating hardware and software of the system for providing video to an immersive display in accordance with the present example is shown in FIG. 8. The network 810 is a 5G network with a Multi-access Edge Computing (MEC) server 820 carrying out the method referred to with reference to FIG. 6. The apparatus facilitated sending 360° live video from a camera 808 to a VR headset 812 utilizing 5G wireless connection, and utilizing VR headset direction for foveated compression.

The sending system 802 utilized an Insta360 Evo™ 360° camera 808 with a maximum resolution of 5760×2880 (~6K) as the video-capturing device. The receiving system 804 utilized an Oculus Quest™ VR headset 812 with a per-eye resolution of 1440×1600 and about 90° field of view (FOV) along the horizontal axis. Note that while viewing a ~6K 360° video, the visible portion of the video in the Oculus Quest's FOV is nearly at maximum resolution (1440×1440 pixels).

The receiving system 804 utilized a millimeter wave (mmW) 5G indoor station on the FR2 band with an InseeGo 5G MiFi™ M1100 modem 816 for 5G connection. A MEC server 820, which is part of the 5G network 810, was utilized for carrying out the method. The MEC server 810 ran Red Hat Enterprise Linux (v7.9) with 32 GB RAM and an 8-core Intel Xeon 8268 at 2.9 GHz. All software dependencies were installed with yum.

The x264 library was customized for the compression method to output video in the standard H.264 codec, and video encoding and decoding was carried out utilizing the open-source FFmpeg 4.4 multimedia library. The sending system 802 was implemented utilizing Unity and a customized video-sending application running on a desktop computer 806 was created for the Insta360 Evo 360° camera 808.

Three software components were developed, including software at the sending system 802, software at the MEC Server 810, and software at the receiving system 804. Utilizing the hardware and software, the 360° camera 808 and virtual reality headset 812 were connected via the network 810. During streaming, the 360° video was sent from the sending system 802 as a stream of H.264 compressed packets to the MEC server 820, encapsulated in a custom-designed TCP-based protocol.

Upon reception at the MEC Server 820, static-foveated compression was applied to the 360° video stream to reduce its size and more effectively transmit the information. The video frames from the sending system 802 were decoded at the MEC Server 820 and re-encoded by dynamically reallocating the video quality based on the direction of the virtual reality headset 812. The re-encoded video were then transmitted to the receiving system 804 via 5G communication.

At the highest resolution (~6K), the Insta360 Evo camera 808 output two separate video streams corresponding to front and back 180° fisheye cameras. These streams were processed separately on the MEC 820, and then combined and rendered into a "skybox" texture at the receiving system.

Sending System

The sending system 802 included the 360° camera 808 and a forwarding application, referred to as a Forwarding Client application hosted on the electronic device, which in this example implementation was a desktop computer 806. Together the camera 808 and application captured the scene and transmitted the video stream to the MEC server 820. When the video stream started, the Forwarding Client established a connection with the MEC server 810, to an instance of the MEC Server Pipeline. The video was forwarded to the server node over TCP. The sending system 802 sent two compressed video streams (the front and back hemispheres) as produced by an onboard encoder of the camera. Each stream is H.264 Main Profile video at 30 fps, 50 Mbps per camera, for a total of 100 Mbps.

MEC Server

The MEC Server 820 created and maintained instances of the MEC Server Pipeline which connected the Sending system 802 and the receiving system 804. After establishing connections with both, each instance of the pipeline focally encoded a respective one of the video streams utilizing the direction information received from the receiving system. Each MEC Server Pipeline was a load-balanced pipeline composed of four task threads that received the stream from the sending system, decoded the stream, re-encoded the stream using the direction information, and transmitted the re-encoded video to the receiving system respectively. The encoder and decoder wrapped FFmpeg's libavcodec, taking advantage of hardware acceleration and fine-grained encoder controls. A customized build of the x264 encoder and the "ultrafast, zero-latency" encoder preset were utilized keep encoder delay down.

The customized x264 encoder received the stream of direction data orientation vectors from the receiving system over UDP. The encoder utilized the direction data to dynamically adjust the output quality of the video, boosting quality in the areas visible to the user of the virtual reality headset while decreasing quality in the areas outside the field of view. The implementation of the MEC Server Pipeline achieved real-time frame re-encoding with sub 25 ms of latency.

Receiving System

Figure 9:
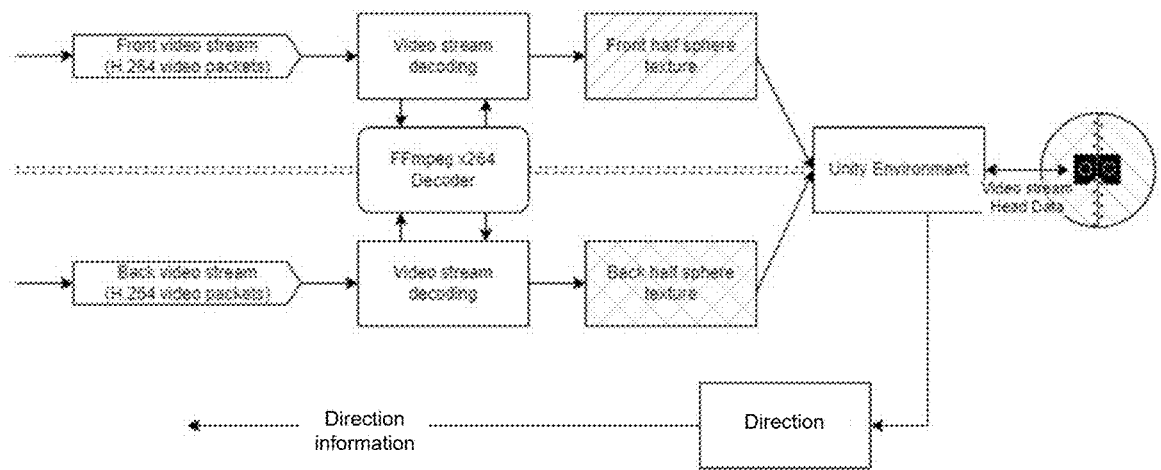
FIG. 9 illustrates an example of a communication architecture at the receiving system of FIG. 8.

The receiving system 804 included the VR headset 812 and a desktop computer 814 in communication with the MEC server 820 via a 5G mmWave modem 816. FIG. 9 illustrates an example of a communication architecture at the receiving system 804 of FIG. 8 The receiving system 804, including software implemented in Unity, received the video streams and decoded the streams using FFmpeg and x264. The decoded video frames were copied into textures and rendered onto a sphere mesh object surrounding the user, utilizing a custom shader to reverse the distortion of the Insta360's fisheye lenses. Simultaneously, the direction of the headset 812 was continually determined to identify the user's viewing direction and sent to the MEC server 820 as UDP packets. UDP was used to minimize latency, as head data easily fit into individual packets, and loss of this data was not critical. Timestamps were used to protect against reordered reception of packets.

A decoding plugin, video renderer, and direction information sender are provided by the hardware executing software on the receiving system 804, including the desktop computer 814. The decoding plugin, implemented in C++ and linked to Unity as a native-code plugin, wrapped FFmpeg and x264 and decoded incoming video data using a "fast decode, zero-latency" preset. Each incoming frame was decoded into a 2880×2880 image and mapped to a Unity texture.

The video renderer was implemented as a custom shader, which bound the two separate decoded textures and used texture lookups to dynamically unwrap the fisheye lens videos into full 360° video for surrounding the user. The direction information sender obtained the direction of the VR headset 812, encoded the rotational vector as a binary packet, and transmitted the binary packet at 30 Hz to the MEC server 820 as a stream of UDP packets. Video frames were encoded at the same rate as the camera's frame rate, keeping bandwidth usage and latency of video delivery low.

Compression Based on Direction

The method was carried out utilizing the customized x264 encoder. The MEC server 820 received the direction information from the receiving system 804 at 30 Hz. The method was implemented through modification of an x264 library called by FFmpeg during the encoding process. Libx264, which was utilized, included functions for applying quantization to the signal produced by an image during standard H.264 video encoding. Quantization was applied to the frame through the quantization parameter (qp), controlling the degree to which details are removed from the macroblocks that make up a frame. A higher qp corresponds to a more restricted bitrate and thus a reduced level of detail in the transmitted image.

The x264's rate control function, which determines the qp for each 16×16 macroblock, was modified to apply static-foveated compression to the frame. The static-foveated compression used a fixed transmission field of view. Each macroblock had its proximity measured to the center of a user's FOV in polar coordinates to determine if it was within the view of the user. As in the case of mapping for the shader, the effects of distortion caused by the fisheye lenses were also removed via geometric mapping. If the distance between the macroblock and the real-time position vector for the direction of the headset, and thus the direction of the user's head, was within the fixed field-of-view standard H.264 quantization was applied. However, in cases in which the distance exceeded the threshold, the macroblock was subjected to a constant qp value of 51 which heavily reduced the bitrate of the signal for that block. Since the heavily quantized regions of the frame occurred outside of the user's FOV, the user's experience with the streamed VR media was not impacted.

Fisheye Camera Mapping

The Insta360 Evo camera includes two circular fisheye lenses, each with a field of-view of about 185 degrees, which, combined, produce a 360° video. At the highest resolution (5760×2880), the camera produces two separate square video streams, one for each camera. The Insta360's smartphone companion app automatically unwraps these videos into VR videos for display. To display the video on the Unity receiver, fisheye undistortion was implemented. As there are multiple different fisheye projections, the camera's projection mapping (equidistant fisheye) and relevant distortion parameters were determined through reverse engineering, to mathematically relate spherical angles onto corresponding points in the camera images.

For a given spherical angle, i.e., the view direction from the VR focal center to the VR video sphere, the angle was converted into a normalized view vector (x, y, z). Based on the sign of z, the appropriate camera image was selected (i.e., front- or rear-facing). The magnitude of z was translated into the distance from the center of the lens image, while the x and y values were converted into the polar angle around the circular lens image. During rendering in VR, this forward transformation was applied to obtain the texture coordinate for each rendered pixel, based on the view angle of that pixel from the camera. During macroblock quality adjustment, this transformation was applied in reverse to identify the view angle for the center of each macroblock, establish the angular distance to the user's viewing direction, and determine whether the macroblock falls within transmission field of view.

Evaluation

The system and method was evaluated to determine 1) How much static-foveated area (90° to 180°) is suitable, and 2) the visual quality improvement achieved given the same video bitrates. Two sets of measurements were conducted to determine turnaround time (latency) and within-FOV visual quality. Both measurements and user studies were carried out.

Foveation Turnaround Time

A smaller foveated area saves bandwidth of video delivery and produces high video quality in the foveated area given the same overall video bitrates. However, an overconstrained static-foveated area may result in the appearance of video artifacts in the field of view as the user turns their head. A suitable foveated area thus balances system performance and user perception. A key contributing factor is the static-foveation turnaround time, which stands for the latency between the receiving system's delivery of direction information and the reception of the correspondent foveated frame. For this example of a 5G millimeter wave, a foveation turnaround time that is close to what is achievable with a hardwired connection is desirable.

Measurement Configuration

As indicated above, the receiving system in the present example sent the direction information to the MEC server as UDP packets. A timestamp was attached to each direction information packet transmitted by the receiving system. The MEC server sent back the most recent head-data timestamp it received with the static-foveated video frames generated. The timestamps were attached as extra non-video metadata in the video packets and were not affected by the compression process. At the arrival of each video frame, the VR client calculated the foveation turnaround time by subtracting the timestamp on the video frame from the system time. The average turnaround time for static foveation during 1 minute of video streaming was benchmarked. Similar measurements with the same video under different network configurations were taken including, 1) a wired Ethernet connection, 2) WiFi broadcasted from a router connected to the same wired ethernet, 3) 5G mmW, and 4) 4G LTE.

The wired Ethernet connection had the lowest network latency and an average turnaround time of 46 ms (std=12 ms). In comparison, 5G mmW had a similarly low turnaround time of 56 ms (std=20 ms). Both Ethernet and 5G mmW had a lower and more stable turnaround time than using 4G LTE (mean=151 ms, std=187 ms). It was surprising that using WiFi (mean=47 ms, std=12 ms) achieves about the same turnaround time as using Ethernet. It was determined that this is because the WiFi utilized was broadcasted from a router that connected to the same wired Ethernet connection, making the difference in network latency negligible. The low latency provided by mmW 5G makes it feasible to set a static-foveation area close to a VR headset's FOV.

Within-FOV Visual Quality

Visual quality is a key feature for any video streaming and conferencing system. The use of foveated rendering facilitates streaming a higher bitrate n the selected focal area, thus providing the same perceived visual quality within a user's FOV when streamed at an overall lower bitrate.

Measurement Configuration

To capture the visual quality that is perceived by a user during a VR telepresence experience, the average visual quality was benchmarked with Peak Signal-to-Noise Ratio (PSNR) and FOVVideoVDP within the VR headset's FOV. The video utilized was a 20-second clip of an indoor scene directly recorded from the ~6K 360° camera at 30 fps. For this measurement, the MEC application was configured to enable video streaming with pre-recorded videos saved on the server. For each measurement, the VR headset's dual-eye view was mirrored on the desktop at the receiving system and screen recorded. Similar measurements were made utilizing different combinations of bitrates (i.e., 32 Mbps, 16 Mbps, 8 Mbps, 4 Mbps, 2 Mbps, and 1 Mbps) and sizes of the focal area (i.e., horizontal and vertical 90°, 120°, 150°, 180°, and no foveated compression) to obtain 30 video clips. The PSNR (dB) and FOVVideoVDP (measured in Just-Objectionable-Difference (JOD) and with the -foveated flag set to true) between the screen recording produced with the original and the 30 statically foveated compressed video clips were calculated. FOVVideoVDP was selected as a second metric because this metric accounts for video flickering (temporal aliasing), and is suitable for foveated videos. Before the measurements, the PSNR and JOD between two screen recordings produced with the same original videos were calculated. The results were 43.43 dB and 9.66 JOD, to establish the highest possible PSNR and FOVVideoVDP with this system.

Figures 10, 11:
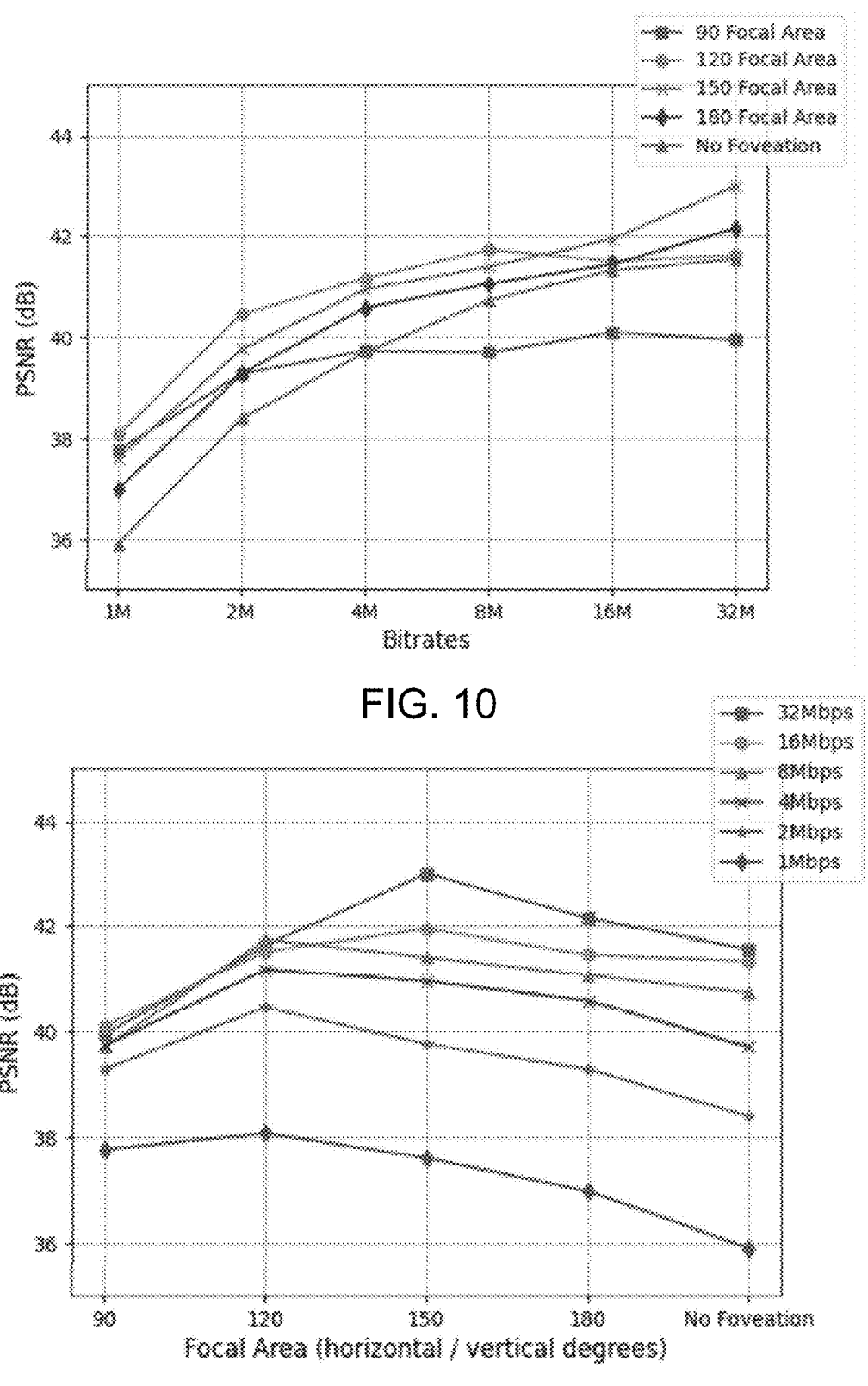
FIG. 10 is a graph illustrating visual quality differences in peak signal-to-noise ratio for various focal areas.
FIG. 11 is a graph illustrating visual quality differences in peak signal-to-noise ratio for different bit rates.
Figures 12, 13:
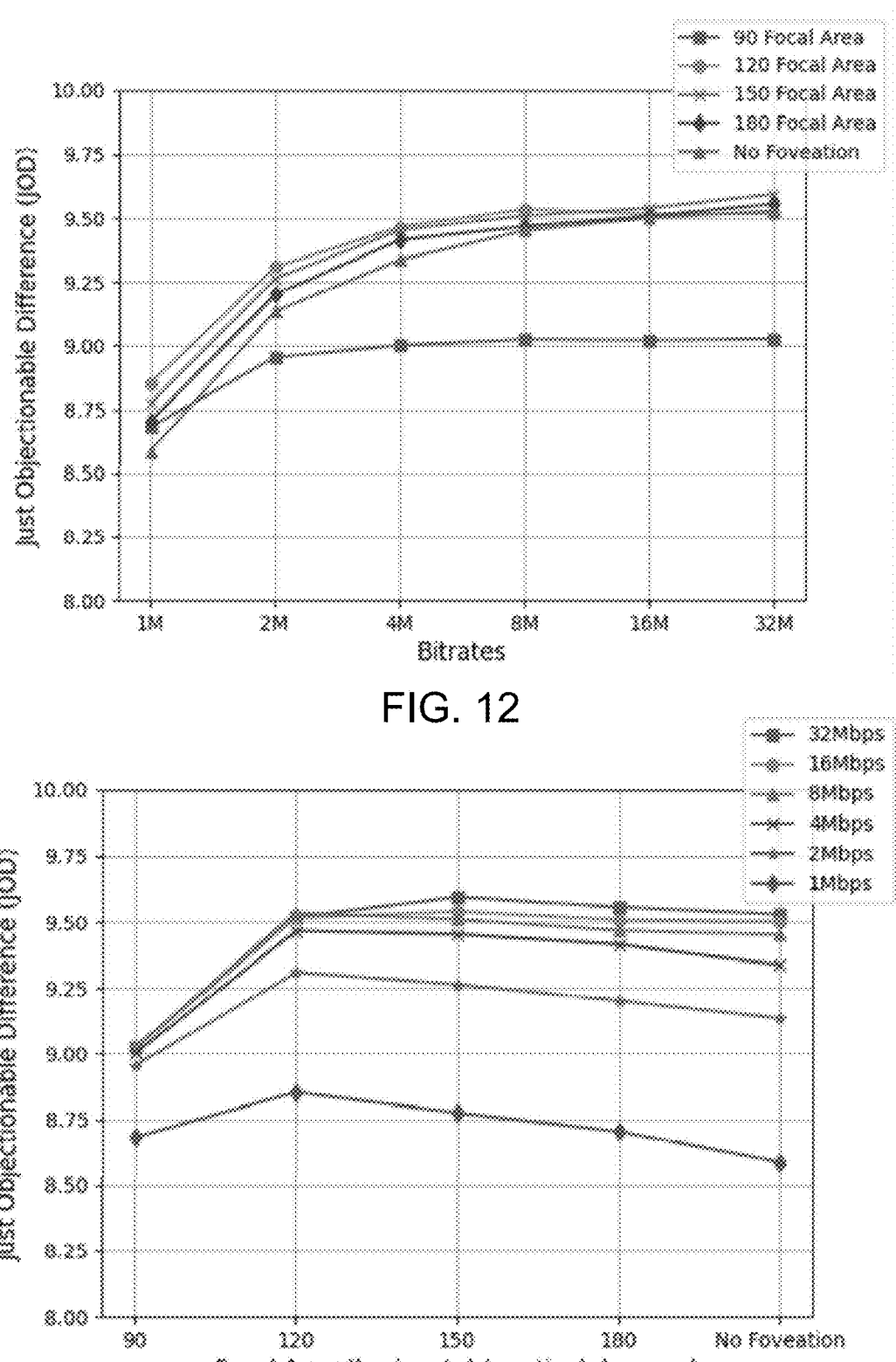
FIG. 12 is a graph illustrating visual quality differences in FOVVideoVDP measured in Just-Objectionable-Difference (JOD) for various focal areas.
FIG. 13 is a graph illustrating visual quality differences in FOVVideoVDP measured in Just-Objectionable-Difference (JOD) for different bit rates.

Visual quality measurements are shown in FIG. 10 through FIG. 13. JOD is a relatively large measure as an image that is 1 JOD higher than another indicates that the image with the higher number is preferable for 75% of people. FIG. 12 and FIG. 13 are plotted with the y-axis range from 8-10 JODs. As shown, higher video bitrates lead to higher video quality. FIG. 10 and FIG. 12 show that with the same bitrate, the within-FOV visual quality with foveated rendering is always higher than the videos without foveation, with the exception of the measurements with a 90°

FOV. This is because 90° was close to the VR headset FOV and is susceptible to visual artifacts at the periphery of the VR headset field of view. As shown in FIG. 11 and FIG. 13, given the same bitrates, foveated rendering provides an increase in visual quality. This video quality improvement plateaus and decreases with a larger foveated area. Notably, the visual quality of a video streamed at a 120° focal area and 4 Mbps is comparable to the same of a video streamed at 32 Mbps without foveated rendering.

User Experiments

User experiments were also conducted to further evaluate the foveated rendering and user-perceived visual quality. The experiments included two Just Noticeable Difference (JND) tests and one session of end-to-end 360° Video Conferencing. All user experiments were conducted utilizing the system described in this example. 15 participants with an average age of 24 and normal or corrected-to-normal vision were utilized. Participants with prior experience related to virtual reality and 360° video streaming were utilized.

Just Noticeable Static Foveation

Ideally, the implementation of foveation is not detectable during 360° video conferencing. JND tests were carried out to determine the smallest focal area that is enough for a user to notice video artifacts as they turn their heads. For this JND test, the MEC was configured to linearly decrease the focal area from horizontal/vertical 180° to 75° over the course of a 1-minute video. All users watched the same 360° videos of an outdoor scene streamed in the VR headset.

15 participants yielded 75 data points, as shown in Table 1. From the results, the 0.5 just noticeable static-foveation (50% percentile) was calculated to be horizontal/vertical 92.78°, which is only 2.78° larger than the FOV of the VR headset utilized. This result is consistent with the low foveation turnaround time. The low network latency provided by the system thus makes it feasible to set the focal area to closely match the VR headset field-of-view in foveated rendering.

TABLE 1

| | | Just Noticeable Static Foveation Results. | | | |
|---|---|---|---|---|---|
| Participant id | Round 1 | Round 2 | Round 3 | Round 4 | Round 5 |
| P1 | 90.75° | 82° | 96° | 115.25° | 97.75° |
| P2 | 94.25° | 125.75° | 99.5° | 108.25° | 99.5° |
| P3 | 76.75° | 89° | 104.75° | 136.25° | 145° |
| P4 | 90.75° | 99.5° | 83.75° | 97.75° | 136.25° |
| P5 | 96° | 111.75° | 99.5° | 96° | 89° |
| P6 | 96° | 80.25° | 89° | 90.75° | 110° |
| P7 | 97.75° | 83.75° | 89° | 90.75° | 103° |
| P8 | 76.75° | 82° | 87.5° | 89° | 83.75° |
| P9 | 76.75° | 97.75° | 75° | 90.75° | 101.25° |
| P10 | 87.25° | 110° | 113.5° | 101.25° | 118.75° |
| P11 | 106.5° | 80.25° | 87.25° | 76.75° | 94.25° |
| P12 | 78.5° | 75° | 76.75° | 75° | 76.75° |
| P13 | 75° | 78.5° | 80.25° | 76.75° | 75° |
| P14 | 80.25° | 82° | 87.25° | 92.5° | 97.75° |
| P15 | 76.75° | 80.25° | 92.5° | 90.75° | 83.75° |

Just Noticeable Visual Quality Degradation

The method of foveated rendering described herein provides improved visual quality given the same bitrates compared to non-foveated rendering.

Second JND tests were carried out to determine what bitrate can be saved without a perceivable visual quality degradation. The MEC was configured to stream "mirrored" videos on the left and right hemispheres of the 360° videos. For one hemisphere, the video was streamed at 32 Mbps without foveated compression while the other hemisphere was streamed with foveated compression while setting the focal area to horizontal/vertical 120°. The bitrate of the hemisphere with foveated compression was initially set to 16 Mbps. In instances in which the participant indicated that there is no visual difference or incorrectly identified which hemisphere has the lower-quality video, the bitrate of the lower-quality hemisphere was decreased by half. The process was repeated until the participants correctly determined the hemisphere of the 360° video with the lower visual quality. The bitrate of the lower-quality side was then increased by 1 Mbps and the process repeated until the participant failed to correctly point out which hemisphere has the lower visual quality. The hemisphere that streamed the video with foveated compression was randomly selected utilizing a binary random number generator.

Figure 14:
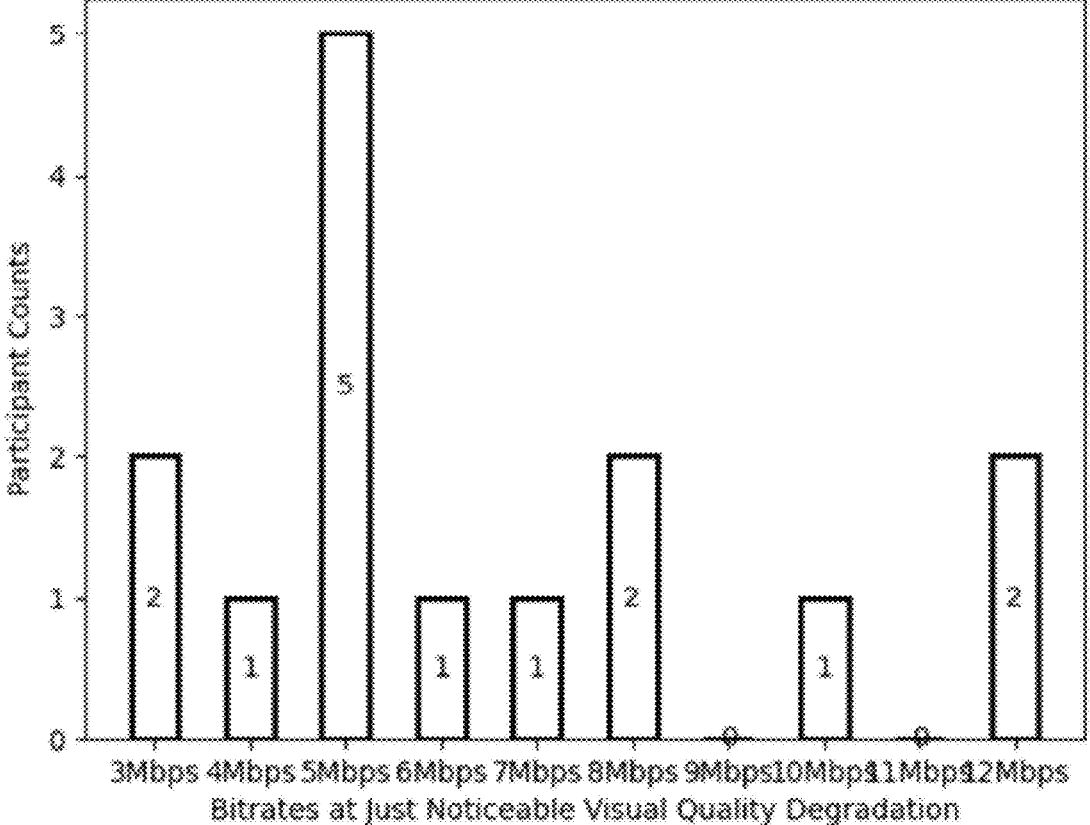
FIG. 14 is a graph illustrating a count of Just Noticeable Visual Quality Degradation at varying bitrates from 32 Mbps to 6 Mbps.

The results of the just noticeable visual quality degradation tests are shown in FIG. 14. Compared with a 32 Mbps video, half of the users did not notice any visual quality degradation in the focal area until the bitrates dropped to less than 6 Mbps, marking an up-to 80% bitrate save. This result shows that the present method of foveated rendering significantly reduces bitrate while preserving perceived visual quality.

End-to-End Video Conferencing

The user experience was also evaluated in an end-to-end video conference application utilizing the present method and system by streaming a remote environment with the 360° camera while the participant viewed the 360° video streamed in the VR headset.

Participants reported that teleconferencing utilizing the present method is more immersive and realistic than other video conferencing methods and were able to omnidirectionally explore the space from a first-person perspective.

Advantageously, the present method and system provides video transmission with relatively low latency and video quality that is less susceptible.

The described embodiments are to be considered as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

The invention claimed is:

1. A method of a computing system of a communication network for providing video to a portable display device, the method comprising:

establishing a connection with a receiving system comprising the portable display device;

obtaining compressed video data and decoding the compressed video data to provide decoded video data;

receiving direction information from the receiving system, the direction information related to a direction of the portable display device;

identifying a respective location of each macroblock of a plurality of macroblocks of the decoded video data;

determining a respective distance between a location determined based on a field of view identified utilizing the direction information, and the respective location of each macroblock of the decoded video data;

encoding the decoded video data utilizing a respective quantization parameter identified based on the respective distance determined for each macroblock to provide re-encoded video data; and sending the re-encoded video data to the receiving system for display on the portable display device.

2. The method of claim 1, comprising establishing a connection with a sending system, for receiving the compressed video data from the sending system; wherein obtaining the compressed video comprises receiving the compressed video from the sending system.

3. The method of claim 2, wherein the network comprises a wireless network.

4. The method of claim 3, wherein the computing system comprises an edge computing system.

5. The method of claim 4, wherein the wireless network comprises a 5G network.

6. The method of claim 3, wherein the direction information is received via User Datagram Protocol (UDP).

7. The method of claim 1, wherein the compressed video data comprises compressed circular lens images, and wherein identifying a respective location of each macroblock of a plurality of macroblocks of the decoded video data comprises determining a spherical angle to a point in the macroblock, and determining a respective distance comprises determining an angular distance between the spherical angle determined for each macroblock and a direction to a point in the field of view.

8. The method of claim 7, wherein the point in the field of view comprises a center of the field of view identified based on the direction information.

9. The method of claim 1, wherein encoding the decoded video data comprises:

identifying first ones of the macroblocks for which the respective distances fall within a threshold distance of the location determined based on the field of view, and encoding the first ones of the macroblocks utilizing a first quantization parameter;

encoding second ones of the macroblocks for which the respective distances are outside the threshold distance utilizing a second quantization parameter.

10. The method of claim 1, wherein the respective quantization parameter is determined based on the distance, wherein the quantization parameter is correlated with the distance.

11. The method of claim 1, wherein encoding the decoded video data comprises:

identifying first ones of the macroblocks that are within a field of view of the portable display device determined based on the direction information and encoding the first ones of the macroblocks utilizing a first quantization parameter; and encoding second ones of the macroblocks that are outside the field of view utilizing a second quantization parameter.

12. The method of claim 1, wherein in response to detecting a change in direction of the portable display device based on the direction information, determining updated distances based on an updated field of view and determining respective updated quantization parameters based on the updated distances.

13. The method of claim 12, comprising updating the re-encoded video data utilizing the updated quantization parameters by sending, for each of the macroblocks, data comprising a difference between the macroblock encoded utilizing the respective quantization parameter and the macroblock encoded utilizing the updated quantization parameter.

14. The method according to claim 11, wherein encoding the first ones of the macroblocks of the decoded video data that are within the field of view comprises encoding utilizing a standard H.264 quantization.

15. The method of claim 1, wherein sending the re-encoded video data comprises sending each of the macroblocks along with a respective quantization factor.

16. The method according to claim 1, wherein receiving the compressed video data from the sending system comprises receiving live video from a sending system.

17. The method of claim 1, wherein the network comprises an internet service provider (ISP).

18. The method of claim 17, wherein the computing system comprises an internet server caching proxy.

19. A computing system of a communication network, the computing system comprising at least one processor; and at least one memory storing instructions thereon for execution by the at least one processor to cause the apparatus to perform the method of claim 1.

20. A method for an edge computing system of a wireless communication network for providing video to a portable display device, the method comprising:

establishing a connection with a receiving system comprising the portable display device;

obtaining video data for providing to the receiving system;

receiving direction information from the receiving system, the direction information related to a direction of the portable display device;

identifying a respective location of each macroblock of a plurality of macroblocks of the decoded video data;

determining a respective distance between a field of view location identified utilizing the direction information, and the respective location of each macroblock of the decoded video data;

encoding the decoded video data utilizing a respective quantization parameter identified based on the respective distance determined for each macroblock to provide encoded video data; and sending the encoded video data to the receiving system for display on the portable display device.

* * * * *